No. 632,616. Patented Sept. 5, 1899.
D. ALFVÉN.
CENTRIFUGAL MACHINE.
(Application filed Dec. 28, 1897.)
(No Model.)
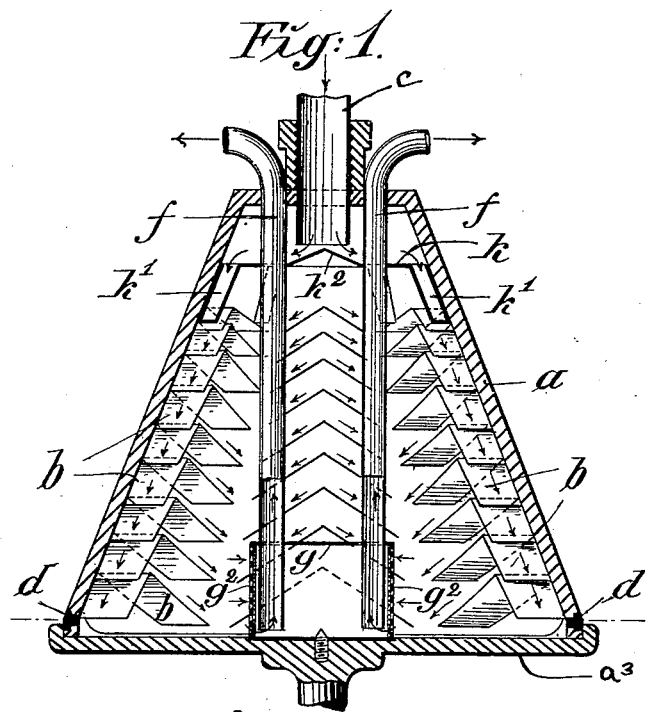
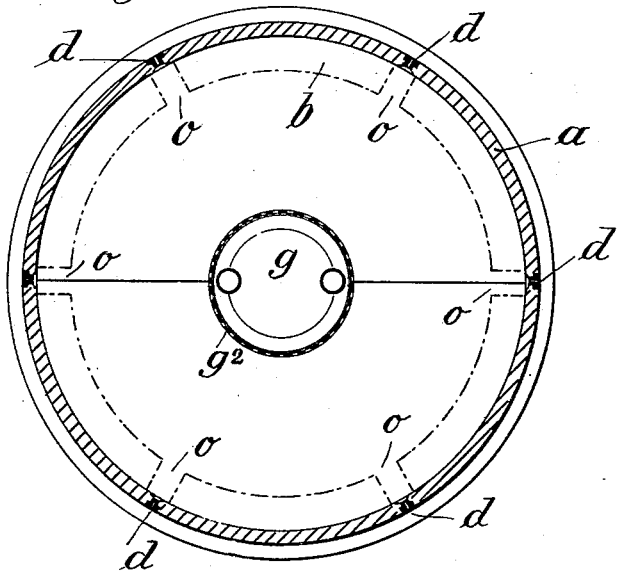
Witnesses
Inventor
David Alfvén

UNITED STATES PATENT OFFICE.

DAVID ALFVÉN, OF STOCKHOLM, SWEDEN, ASSIGNOR TO THE AKTIEBOLAGET SEPARATOR, OF SAME PLACE.

CENTRIFUGAL MACHINE.

SPECIFICATION forming part of Letters Patent No. 632,616, dated September 5, 1899.

Application filed December 28, 1897. Serial No. 663,990. (No model.)

*To all whom it may concern:*

Be it known that I, DAVID ALFVÉN, engineer, a subject of the King of Sweden and Norway, residing at Stockholm, in the Kingdom of Sweden, have invented certain new and useful Improvements in Centrifugal Machines for Separating Solid Matters from Liquids; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

The invention has relation to centrifugal separators; and it has for its object structural features whereby the efficiency of the separator is materially enhanced and the operation of separation greatly facilitated and expedited.

In the separation of solid or more or less solid substances from a liquid—as, for instance, in the manufacture of yeast or sugar or in the purification of oils—the separation of the solid or more or less solid constituents is materially interfered with, because the heavier constituents under centrifugal action tend to accumulate at the point of discharge and to choke up the discharge passage or port.

One of the essential features of my invention is to so construct the separator as to effectually avoid accumulation of the solid constituents at the point of discharge. This I accomplish by dividing the inner surface of the separator into sections by vertical passages and by connecting these passages by means of more or less inclined or angular channels that guide and direct the solid constituents driven to the inner surface of the separator by centrifugal action into the said vertical passages, at the foot of each of which I provide a discharge passage or port. It will readily be seen that by the means described the mass of solid constituents driven to the walls of the separator by centrifugal action is divided up and caused to flow in numerous streams into said vertical passages, from the lower ends of which said constituents are discharged as fast as they reach the discharge-ports. Hence an accumulation at the points of discharge and the choking up of the discharge-passages are effectually prevented. This object I attain in various ways, as will hereinafter appear and as shown in the accompanying drawings, in which—

Figure 1 is a vertical central section of so much of a centrifugal separator as will be necessary to illustrate my invention. Fig. 2 is a cross-section thereof, the vertical and inclined or angular channels being shown by dotted lines. Figs. 3 and 4 are views similar to Fig. 1, illustrating modified arrangements of the separating and directing ledges; and Figs. 5 and 6 show in plan and by a perspective view, respectively, the separating and directing or dividing bodies which are or may be used in conjunction with the vertical and angular channels or passages above referred to.

The separator consists, essentially, of a hollow shell or casing having, preferably, the form of a truncated cone and adapted to be revolved about a vertical spindle in a well-known manner. As shown in the drawings, the shell $a$ is closed at its upper smaller end and has formed therein a distributing-chamber $a^2$ by a partition $k$, having a central upwardly-projecting distributing-cone $k^2$ and peripheral ports leading to short distributing-pipes $k'$, extending along the walls of and into the separating-chamber.

Through the upper end wall $a'$ of the shell or casing $a$ passes fluid-tight a feed-pipe $c$, whose outlet lies immediately above the apex of the distributing-cone $k^2$, so that the liquid fed to chamber $a^2$ is uniformly diverted in all directions toward the vertical walls of said chamber to the peripheral distributing ports and pipes $k'$, thus insuring a uniform distribution of the liquid.

The vertical passages hereinabove referred to extending along the inner face of the shell $a$ and the inclined or angular dividing or distributing channels are formed, as shown in Fig. 1, by tiers of ledges $b$, which latter have the form of an inverted V—*i. e.*, triangular—forming between one another reversely-inclined channels or comparatively deep grooves, which lead to the vertical passages $o$, formed by and between each two tiers of ledges $b$. At the foot of each of the vertical passages $o$ is a discharge-port $d$, so that the heavier particles driven by centrifugal action to the walls of the separator are there distributed through the channels between the ledges $b$ and gravitate into the vertical channels $o$, from which they are discharged as fast as they reach the ports $d$ at the foot of said passages. The same results are obtained by arranging the ledges in the several tiers spirally, as shown at $b'$, Fig. 3.

The efficiency of the described means for dividing up the heavier constituents driven to the walls of the separator by centrifugal action and leading or directing said heavier constituents to a number of discharge-ports located at different points of the periphery of the separator may be materially enhanced by the use of auxiliary separating devices, such as shown in Fig. 4, whether the dividing passages and channels are formed by inverted-V-shaped ledges $b$, Fig. 1, or by spirally-arranged ledges $b'$, Fig. 3. As an example, I have shown in Fig. 4 the ledges $b$, (shown in Fig. 1,) and in combination therewith auxiliary dividing and directing bodies. These bodies C are of the general form of a hollow truncated open-ended cone, which, developed or flattened out, has the form of a star, the number of points of which depends upon the number of tiers of ledges $b$. In said Fig. 4 the separator is supposed to have six tiers of ledges $b$. Hence the dividing and directing cones are six-pointed stars folded or creased along the apices of the angles to form alternate salient and reëntering angles. The latter angles form external diverging channels $c$, while the salient angles form similar internal channels $c'$. These dividing and directing bodies C are likewise arranged in tier within the space encompassed by the ledges $b$, and the number of superimposed bodies C is equal to the number of ledges $b$ in a tier of such. Furthermore, the bodies C are so arranged relatively to the tiers of ledges $b$ that the reëntering and salient angles will respectively lie in the planes of the vertical passages $o$ and in the planes of the apices of the ledges $b$, the tier of bodies C constituting, in fact, a second separator, whereby are separated those constituents the specific gravity of which is approximately the same as that of the constituents of least specific gravity which are caused to move toward or to the axis of the separator and are discharged through the pipe or pipes $f$. This is of importance in the separation of liquids holding solids in a more or less divided state in suspension—as, for instance, the separation of yeast from its liquid constituents—in order to reduce the loss of yeast to a minimum. This loss can, however, be absolutely prevented by the use of a filter, as shown in Fig. 1, and consisting of a casing $g$, seated in a recess in the bottom $a^3$ of the separator and having perforated vertical walls which may be clothed inside or outside with a filtering material $g^2$, as felt or the like. The top of the filter is imperforate and provided with openings for the passage of the discharge pipe or pipes $f$, as shown. The lighter liquid expelled through the pipes $f$ is, as usual, discharged into a suitable receiver arranged in a well-known manner around the upper end of the separator, while the constituents heavier than said liquid and expelled through the ports $d$ are collected in any well-known manner.

The ledges $b$ or $b'$ may form an integral part of the separator-shell, or they may be secured thereto in any desired manner. I prefer, however, to construct the separator-shell $a$ of one piece, except its bottom $a^3$, which is removably connected with said shell, while the ledges $b$ or $b'$ are secured to a sheet-metal shell K, fitting snugly into the separator-shell $a$. The shell K is somewhat shorter than the shell $a$, its smaller upper end constituting the bottom $k$ of the distributing-chamber $a^2$ and has the conical projection $k^2$, an opening or openings for the passage of the discharge pipe or pipes $f$, and the distributing ports and pipes $k'$, so that by removing the shell $a$ from its bottom $a^3$ the shell K can also be removed and free access had thereto for any purpose. In Figs. 3 and 4 I have shown the bottom $a^3$ as screwed to the shell $a$; but any other means may be adopted whereby said parts may be detachably connected together.

I have herein described and shown in the drawings a centrifugal separator consisting of two interfitting frusta of cones, the inner frustum having tiers of spirally-arranged ledges intercepted by vertical clear spaces, the interior frustum open at its base or wider end seating upon the removable head at the base or wider end of the outer frustum with a view to the ready removal of said inner frustum when it becomes necessary to cleanse the apparatus. I do, however, not intend to claim these features herein, as they form subject-matter of a divisional application, Serial No. 700,549, filed December 28, 1898.

Having thus described my invention, what I claim as new therein, and desire to secure by Letters Patent, is—

1. A centrifugal separator comprising an upright shell revoluble about its vertical axis, ledges projecting from the inner face of said shell in tiers so as to leave a clear vertical passage between each two tiers, the ledges of the latter arranged to form between one another channels inclined relatively to said vertical passages, a discharge-port at the foot of each of said passages, a discharge-pipe extending from near the bottom through the upper end of the shell, and means for feeding the material to be separated through said upper end of the shell, for the purpose set forth.

2. A centrifugal separator comprising an upright shell having the form of a truncated cone adapted to revolve about its vertical axis, ledges projecting from the inner face of the shell in tiers so as to leave a vertical clear passage between each two tiers, the ledges of the latter arranged to form between one another channels inclined relatively to said vertical passages, a discharge-port at the foot of each of said passages, a discharge-pipe extending from near the bottom through the upper end of the shell, and means for feeding the material to be separated to said upper end of the shell, for the purpose set forth.

3. A centrifugal separator comprising an upright shell having the form of a truncated cone and adapted to revolve about its vertical axis, ledges projecting from the inner face of the shell in tiers so as to leave a clear vertical passage between each two tiers, the ledges of the latter arranged to form between one another channels inclined relatively to said vertical passages, a discharge-port at the foot of each of said passages, a discharge-pipe extending from near the bottom through the upper end of the shell, and a distributing-chamber in said upper end of the shell having distributing-channels arranged to direct the material fed to said chamber onto the upper ledge of each tier of such, for the purpose set forth.

4. A centrifugal separator comprising an upright shell having the form of a truncated cone and adapted to revolve about its vertical axis, ledges projecting from the inner face of the shell in tiers so as to leave a clear vertical passage between each two tiers, the ledges of the latter arranged to form between one another channels inclined relatively to said vertical passages, a discharge-port at the foot of each of said passages, a discharge-pipe extending from near the bottom through the upper end of the shell, a distributing-chamber in said upper end of the shell, the bottom of said chamber having a central upwardly-projecting distributing-cone, and distributing-channels arranged to discharge upon the upper ledge of each tier of such, and a feed-pipe having its outlet immediately above the aforesaid distributing-cone, for the purpose set forth.

5. A centrifugal separator, comprising a shell having the form of a truncated cone, inverted-V-shaped ledges arranged in tiers to form correspondingly-angular channels between one another, and vertical clear passages between each two tiers, a discharge-port at the foot of each of said vertical passages, a discharge-pipe extending from near the bottom through the upper end of the shell, and means for feeding the material to be separated to said upper part of the shell at points intermediate of the aforesaid vertical passages, for the purpose set forth.

6. In a centrifugal separator, a shell having the form of a truncated cone, and inverted-V-shaped ledges $b$ projecting from the inner face of said shell in tiers to form reversely-inclined channels between each two ledges and vertical clear passages between each two tiers, and a discharge-port at the foot of each of said vertical passages; in combination with the axially-arranged tier of bodies C, a discharge-pipe extending from near the bottom through the upper end of the shell and through the aforesaid tier of bodies C, and means for feeding the material to be separated to the shell at the upper end, for the purpose set forth.

In testimony whereof I affix my signature in presence of two witnesses.

DAVID ALFVÉN.

Witnesses:
TH. WAWRINSKY,
E. D. WINSLOW.